May 2, 1944. J. J. BLOOMFIELD 2,347,873
MAGNETIC CLUTCH
Filed July 7, 1941 2 Sheets-Sheet 1
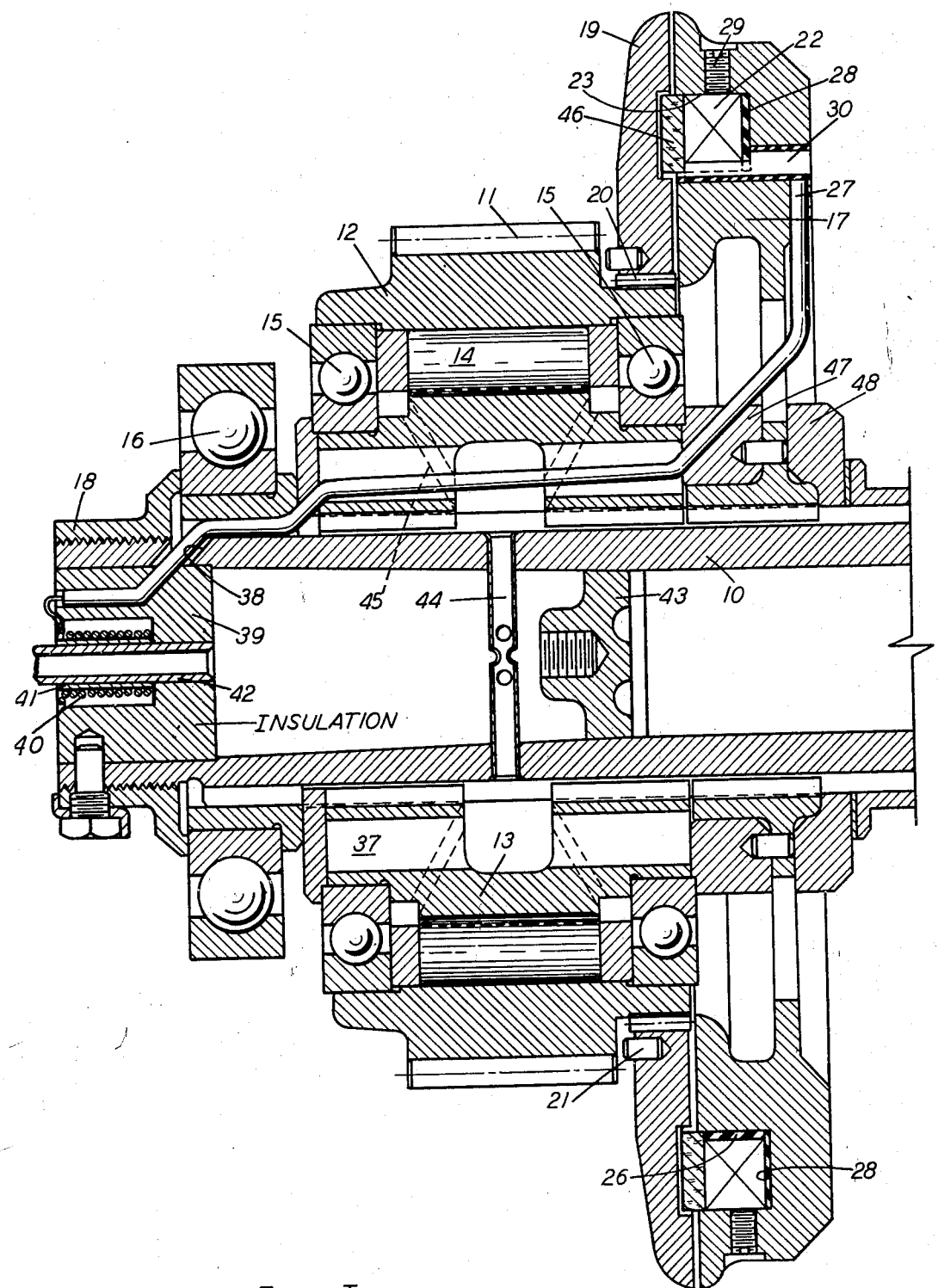
FIG—I
INVENTOR
John J. Bloomfield May 2, 1944. J. J. BLOOMFIELD 2,347,873
MAGNETIC CLUTCH
Filed July 7, 1941 2 Sheets-Sheet 2
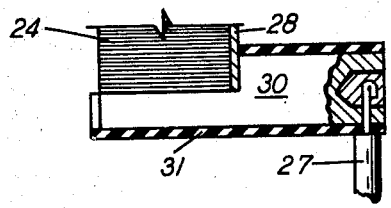
FIG—II
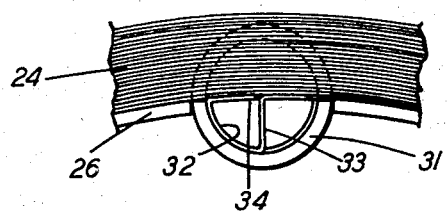
FIG—III
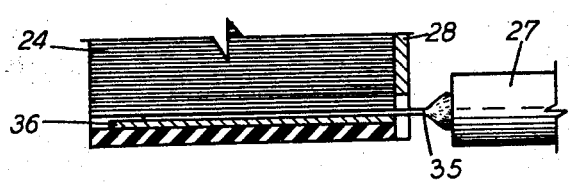
FIG—IV
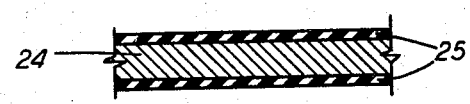
FIG—V
INVENTOR
John J. Bloomfield Patented May 2, 1944

2,347,873

UNITED STATES PATENT OFFICE 2,347,873

MAGNETIC CLUTCH

John J. Bloomfield, Burbank, Calif., assignor, by mesne assignments, to Lockheed Aircraft Corporation, a corporation of California Application July 7, 1941, Serial No. 401,328

6 Claims. (Cl. 192—84)

This invention relates to an improved magnetic clutch for the transmission of power, and has particular bearing on the use of such a clutch as a lock-up for another slipping or one-way drive in parallel therewith.

For illustrative purposes, I have chosen to disclose the use of the magnetic clutch as a lock-up for a one-way drive roller clutch used to transmit power from an airplane engine to a propeller to allow windmilling of the latter, or to allow one engine, of several driving one propeller, to drop out of the drive. With such an arrangement it is desirable to lock-up the one way drive for the reverse transmission of torque from the propeller to the engine, and a magnetic clutch is particularly adapted for such a lock-up since it is capable of operating under heavy loads and speed differentials.

As heretofore constructed, magnetic clutches have presented difficulties in the insulation of the electrical winding and in the retention of same in a groove in the face of one of the clutch members. The ordinary insulated wire type of winding offers difficulty in arranging successive coils or layers in that the completed coil winding cannot completely and solidly fill the groove therefor, and tends to pull or work out of the groove. It is accordingly an object of this invention to provide an improved coil winding comprising thin superimposed layers of anodized aluminum strip or foil material of the width of the coil, so that the complete coil becomes a solid unit that can be prewound and inserted in a groove in the face of one of the clutch members. I have discovered that anodized aluminum strip of suitable gage provides adequate electrical insulation for such a coil winding, the adjacent anodized surfaces of successive layers being capable of withstanding several times the voltage difference between coils. This enables me to tightly wind such a coil as a seemingly solid metallic ring of substantial rigidity, as the microscopic anodized surfaces of the aluminum do not sensibly modify the metallic character thereof.

It is a further object of this invention to provide an improved magnetic clutch wherein the magnet winding is set into the friction face of one of the clutch members, thus forming a magnetic flux circuit wherein the other clutch member forms a direct path between the magnet poles; and to provide a resilient friction material seated on the winding and carrying a portion of the friction load in engaged position, the resilient material serving to break the continuing contact between the clutch faces resulting from residual magnetic flux in the clutch members. With this arrangement the resilient material cushions the clutch engagement and assists in separating the friction surfaces upon de-energization of the magnet, yet the engaging magnetic force required or absorbed in compressing the resilient material, to obtain full engagement of the main frictional surfaces, serves to supplement the clutch driving torque of such surfaces, rather than being subtracted therefrom as in the case of a clutch releasing spring that would have to be overcome by the magnet prior to clutch engagement.

It is a further object of this invention to provide an improved and simplified coil winding especially adapted for use in electromagnetic clutches wherein an electrical winding is formed of self-insulated ribbon prewound under tension and forming an annular ring about which the magnetic flux can circulate in a direct path resembling a toroid, the preformed winding being so solid and substantial that it may be clamped into a groove in one clutch disc, by means of set screws or the like extending through the wall of the clutch disc.

Other and further important objects of this invention will be apparent from the disclosures in the specification and the accompanying drawings.

The invention consists in the novel parts and combination of parts to be described hereinafter, all of which contribute to produce an efficient magnetic clutch.

A preferred embodiment of the invention is described in the following specification, while the broad scope of the invention is pointed out in the appended claims.

In the drawings:

Figure I is a central longitudinal section through a one-way roller clutch and an electromagnetic clutch, the magnetic clutch serving to lock-up the one-way clutch for the transmission of torque in both directions.

Figure II is an enlarged fragmentary detail of one method of connecting the lead in wire to the coil winding of the magnetic clutch.

Figure III is an enlarged left side view of the lead-in connection of Figure II.

Figure IV is a fragmentary detail of a modified form of lead-in connection.

Figure V is a greatly enlarged diagrammatic section through a single strip of the anodic coated aluminum foil used for the coil winding.

As shown on the drawings:

The one-way and magnetic clutch combination chosen for illustrative purposes is intended to be part of a propeller gear drive wherein an engine crankshaft 10 normally drives a pinion 11, formed on a shell 12, by means of one-way roller clutch the hub 13 of which is splined to the crankshaft 10 and drives the shell 12 in one direction through the wedging action of a series of rollers 14. As shown, the shell 12 is supported from its hub 13 by ball bearings 15, and a larger bearing 16 supports the outboard end of the crankshaft 10. The hub of a magnetic clutch driving disc 17 is also splined to the crankshaft 10, a lock-nut 18, on the end of the crankshaft serving to retain the roller and magnetic clutch hubs in place. A driven disc 19, for the magnetic clutch, is carried on splines 20 on the roller clutch shell 12, the releasing or retracting movement thereof being limited by pins 21. Friction discs 47 and 48 are associated with the hub of the driving disc 17, the disc 47 serving to damp out slight movements between the hubs of the driving disc and the one-way clutch, and the disc 48 serving as a torsional vibration damper between the hub of the clutch disc 17 and the crankshaft.

In the particular design shown it was convenient to position the electro-magnetic winding 22 in the driving disc since the necessary metal to provide an adequate magnetic flux path would be of value for its flywheel effect on the engine crankshaft. This arrangement provides driving and driven members defining a magnetic flux path of approximately toroidal form wherein the winding is positioned in the center of the flux path so that the driven member forms a keeper bridging and in frictional driving contact with the spaced annular poles of the driving member. Since the flux path must be a closed circuit completed through the driving disc, to obtain the maximum clutch pressure, the winding 22 is preferably set into an open groove 23 in the friction face of the driving disc. The winding itself forms an annular ring which is preferably prewound under tension from thin aluminum strip or foil 24, self-insulated by an anodic treatment.

I have found that the insensible and invisible coating 25 in Figure V produced by conventional anodic treatment of aluminum forms an adequate electrical insulation between layers of the winding. In a winding designed for 4 amperes at 12 volts I have found that the two adjacent anodic layers can withstand the voltage difference between layers imposed by 110 volts on the coil, an adequate margin of safety. The commercial anodic treatment of aluminum is believed to be so well known as to require no description. The effect seems to be a reverse plating or etch which produces a firmly adherent microscopic layer of oxide which does not sensibly alter the surface of the aluminum strip or foil. In proportioning the thickness of the strip or foil it is merely necessary to provide a cross-section electrically equivalent to a circular wire of the proper size, due regard being given to the relative electrical conductivity of aluminum and copper. The use of anodized aluminum eliminates the need of an intervening layer of insulating material, so that I have found that the required increase of size of aluminum as compared to copper does not increase the size of the completed coil, which works out at approximately half the weight of the copper necessary for an equivalent magnetic effect.

The coil may conveniently be prewound on a mandrel of suitable size. I prefer to start the winding on a single layer of insulating material 26, and provide means for connecting a lead-in wire 27, as will be described hereinafter; the aluminum strip or foil 24 being wound thereover to the proper number of turns, slight tension being sufficient to result in a very solid winding. On completion of the winding I paint the exposed edges of the strips 24 with a suitable lacquer, and apply a sheet of insulating material 28, impregnated with the lacquer, to the inner face of the winding that bottoms in the groove. The exposed area of the peripheral winding layer has its anodized coating buffed off to make electrical grounding contact with the outer wall of the groove 23 in the driving disc 17, set screws 29 further adding to the ground, as well as retaining the winding 22 in position in the groove.

The arrangement for connecting the lead-in wire 27 to the inner end of the winding, as shown in Figures II and III comprises a plug 30 having an insulating shell 31, the plug being cut down on its inner end to provide a semicircular section 32 extending beneath the winding 22. A vertical slot 33 allows the end 34 of the aluminum strip 24 to be bent down and wrapped about a quarter section of the plug and then soldered to the strip at the point of bending. An alternative method of fastening the lead-in wire is shown in Figure IV wherein the multiple strand wire is fanned out at 35 and soldered to the surface of strip 24, the anodic coating being removed in the immediate vicinity in either case.

As shown in Figure I the lead-in wire 27 extends through an aperture in the hub of the driving disc 17 and thence through one of the lightening holes 37 in the roller clutch hub 13 and beneath the ball bearing 16 to an aperture 38 in the crankshaft, where it passes through an insulating plug 39 and is attached to a coil spring 40 riding on a sleeve 41 on a central terminal 42.

The central terminal not only functions as an electrical terminal for the magnetic clutch, but also supplies oil to the hollow crankshaft 10, which is supplied with an oil plug 43 and an apertured cross tube 44 which feeds oil through oil holes 45 to the rollers and bearings of the one-way clutch.

A further feature of this invention resides in the provision of a layer of resilient material 46 such as cork, seated on the winding 22 and adapted to make initial contact with the driven disc prior to metal to metal contact of the clutch discs. This material is so chosen and proportioned as to be capable of overcoming the residual magnetic flux upon de-energization of the magnetic winding, in order to prevent continued drag between the clutch faces. That portion of the clutch engaging force that is absorbed by the resilient material is still available for clutch driving purposes, so that the clutch is not penalized by the force absorbed, as would be the case if springs or the like were provided to separate the clutch discs.

It will be thus seen that I have invented an improved magnetic clutch wherein an anodic treatment of aluminum strip or foil renders the same self-insulating and thus permits winding a substantially solid coil, of the desired number of turns, that can be rigidly mounted in the clutch disc. Further, the winding so formed can be retained in position by an overlying layer of resilient friction material that will transmit a portion of the driving torque, while being available to overcome the residual magnetic flux when it is desired to release the clutch.

The combination of the overrunning clutch means and the electromagnetic clutch means is described and claimed in my co-pending application, Serial Number 502,088, filed September 13, 1943, entitled "Clutch."

Having thus described my invention and the present preferred embodiments thereof, I desire to emphasize the fact that many modifications may be resorted to in a manner limited only by a just interpretation of the following claims.

I claim:

1. In a magnetic clutch, coaxial driving and driven members having frictional engaging surfaces of radially spaced annular form, each of said members having a channel between its frictional surfaces, a preformed magnet winding adapted to be inserted in said channel of one of said members, comprising a continuous strip of anodized aluminum wound upon itself to the desired number of turns, successive layers being insulated from each other by the anodic coating of said aluminum strip and a ring of compressible friction material applied to the exposed side of said winding and extending from said channel to engage the wall of the other channel.

2. In a magnetic clutch, coaxial driving and driven members having frictional engaging surfaces of annular form, one of said members having a channel in its frictional surface, a preformed magnet winding adapted to be inserted in said channel, comprising a continuous strip of anodized aluminum wound upon itself to the desired number of turns, successive layers being insulated from each other by the anodic coating of said aluminum strip, and clamping means associated with the member having the channel in its frictional surface, said clamping means being adapted to retain said preformed winding in place and to ground one extremity thereof to said member.

3. In a magnetic clutch, coaxial driving and driven members having frictional engaging surfaces of annular form, one of said members having a channel in its frictional surface, a preformed magnet winding adapted to be inserted in said channel, comprising a continuous strip of anodized aluminum wound upon itself to the desired number of turns, successive layers being insulated from each other by the anodic coating of said aluminum strip, and an annular ring of compressible frictional material applied to the exposed side of said winding when in said channel, said frictional material having a volume and compressibility adapted to overcome the residual magnetic forces in the members tending to hold the clutch in engagement upon de-energization of the magnetic winding.

4. In a magnetic clutch, coaxial driving and driven members having frictional engaging surfaces of annular form, one of said members having a channel in its frictional surface, a preformed magnet winding adapted to be inserted in said channel, comprising a continuous strip of anodized aluminum wound upon itself to the desired number of turns, successive layers being insulated from each other by the anodic coating of said aluminum strip, clamping means associated with the member having the channel in its frictional surface, said clamping means being adapted to retain said preformed winding in place and to ground one extremity thereof to said member, and an annular ring of compressible frictional material applied to the exposed side of said winding when in said channel, said frictional material having a volume and compressibility adapted to overcome the residual magnetic forces in the members tending to hold the clutch in engagement upon de-energization of the magnetic winding.

5. In a magnetic clutch, coaxial driving and driven members defining a magnetic flux path through radially spaced frictional surfaces thereon of approximately toroidal form, a magnet winding positioned in the center of said flux path between said frictional surfaces and wholly supported by one of said members, said magnet winding comprising a plurality of layers of aluminum foil self-insulated by prior anodic treatment of the aluminum foil, means providing an insulated electrical connection to one end of said aluminum foil, and means for securing the magnet winding to its supporting member and serving to ground the other end of said foil to the material of said supporting member.

6. In a magnetic clutch, coaxial driving and driven members defining a magnetic flux path of approximately toroidal form, a magnet winding positioned in the center of said flux path and wholly supported by one of said members, said magnet winding comprising a plurality of layers of aluminum foil self-insulated by prior anodic treatment of the aluminum foil, means providing an insulated electrical connection to one end of said aluminum foil, means for grounding the other end of said foil to the material of its supporting member, and an annular ring of compressible frictional material applied to said magnet winding and adapted to engage the other of said members, said frictional material having a volume and compressibility proportioned to assume a minor part of the clutch engaging pressure while adapted to overcome the residual magnetic flux remaining in said members upon de-energization of the magnet winding.

JOHN J. BLOOMFIELD.